(12) United States Patent
Baumeister et al.

(10) Patent No.: US 12,006,115 B2
(45) Date of Patent: Jun. 11, 2024

(54) SACK FOR LIQUID AND PULVERULENT SUBSTANCES COMPRISING A SOLUBLE SURFACE PORTION, METHOD AND USE THEREWITH, AND USE OF A SOLUBLE SURFACE PORTION

(71) Applicant: SIKA TECHNOLOGY AG, Baar (CH)

(72) Inventors: Florian Baumeister, Augsburg (DE); Marc Zintel, Kissing (DE); Tobias Bosse, Augsburg (DE); Thomas Semlinger, Augsburg (DE); Florian Ellenrieder, Augsburg (DE); Oliver Marek, Augsburg (DE)

(73) Assignee: SIKA TECHNOLOGY AG, Baar (CH)

( * ) Notice: Subject to any disclaimer, the term of this patent is extended or adjusted under 35 U.S.C. 154(b) by 902 days.

(21) Appl. No.: 16/494,787

(22) PCT Filed: Mar. 22, 2018

(86) PCT No.: PCT/EP2018/057242
§ 371 (c)(1),
(2) Date: Sep. 17, 2019

(87) PCT Pub. No.: WO2018/177859
PCT Pub. Date: Oct. 4, 2018

(65) Prior Publication Data
US 2020/0095040 A1  Mar. 26, 2020

(30) Foreign Application Priority Data

Mar. 27, 2017 (EP) ..................................... 17163159

(51) Int. Cl.
*B65D 65/46* (2006.01)
*B65D 33/16* (2006.01)
(Continued)

(52) U.S. Cl.
CPC ......... *B65D 65/46* (2013.01); *B65D 33/1691* (2013.01); *B29L 2031/7128* (2013.01);
(Continued)

(58) Field of Classification Search
CPC .... B65D 65/46; B65D 33/1691; B65D 31/08; B65D 33/165; B29L 2031/7128; C11D 17/042
(Continued)

(56) References Cited

U.S. PATENT DOCUMENTS 4,096,944 A   6/1978 Simpson
4,338,048 A   7/1982 Murphy et al.
(Continued)

FOREIGN PATENT DOCUMENTS

CA   2091169 A1   3/1992
DE   29 14 206 A1   10/1980
(Continued)

OTHER PUBLICATIONS

Extended European Search Report for corresponding EP Patent Application No. EP 17163159.1, mailed on Sep. 4, 2017.
(Continued)

*Primary Examiner* — Jes F Pascua
(74) *Attorney, Agent, or Firm* — Oliff PLC

(57) ABSTRACT

The present invention relates to a sack for liquid or pulverulent materials having an areal section (F) composed of a water-soluble polymer, wherein dissolution of the water-soluble polymer gives rise to an opening through which the sack can be emptied, to a sack according to the invention that contains a liquid or pulverulent material, to a method for the emptying thereof and the production thereof, and also to the use of the sack for the packing of liquid or pulverulent materials and to the use of an areal section (F) composed of a water-soluble polymer as part of a sack for liquid or
(Continued)

pulverulent materials for the reduction of the release of unpleasant odors and/or harmful substances into the air, especially for the reduction of the release of alveoli-reaching dusts.

16 Claims, 1 Drawing Sheet

(51) Int. Cl.
  *B29L 31/00* (2006.01)
  *B65D 30/18* (2006.01)
  *C11D 17/04* (2006.01)

(52) U.S. Cl.
  CPC ............ *B65D 31/08* (2013.01); *B65D 33/165* (2013.01); *C11D 17/042* (2013.01)

(58) Field of Classification Search
  USPC .................................................. 383/121–126
  See application file for complete search history.

(56) References Cited

U.S. PATENT DOCUMENTS

| | | | |
|---|---|---|---|
| 4,681,228 A * | 7/1987 | Kerry .................... | B65D 75/38 206/484 |
| 4,772,326 A | 9/1988 | Heinen et al. | |
| 4,973,168 A | 11/1990 | Chan | |
| 5,203,629 A | 4/1993 | Valle et al. | |
| 5,224,595 A | 7/1993 | Sugimoto et al. | |
| 5,224,774 A | 7/1993 | Valle et al. | |
| 5,394,990 A | 3/1995 | Edwards et al. | |
| 5,403,096 A * | 4/1995 | Aagesen ................ | B65D 65/46 206/524.7 |
| 5,492,410 A * | 2/1996 | Cocozza ................ | B65D 31/04 383/1 |
| 5,749,963 A | 5/1998 | Arnold et al. | |
| 6,206,192 B1 | 3/2001 | Winstead et al. | |
| 6,298,984 B1 | 10/2001 | Weaver et al. | |
| 6,306,210 B1 | 10/2001 | Miksic et al. | |
| 6,348,093 B1 | 2/2002 | Rieder et al. | |
| 6,448,317 B1 | 9/2002 | Kaiser et al. | |
| 6,869,984 B2 | 3/2005 | Kawashima et al. | |
| 7,018,089 B2 | 3/2006 | Wenz et al. | |
| 7,270,233 B2 | 1/2007 | Kindt et al. | |
| 7,416,602 B2 | 8/2008 | Murphy et al. | |
| 2004/0086207 A1 | 5/2004 | Marbler et al. | |
| 2008/0075397 A1 * | 3/2008 | Wichmann .......... | B65D 31/142 383/44 |
| 2008/0178769 A1 | 7/2008 | Goodwin et al. | |
| 2012/0033903 A1 | 2/2012 | Lisek et al. | |
| 2014/0293728 A1 * | 10/2014 | Duveau ................ | C04B 24/2623 366/6 |

FOREIGN PATENT DOCUMENTS

| | | |
|---|---|---|
| DE | 20 2008 003 172 U1 | 5/2008 |
| EP | 0 243 750 A2 | 11/1987 |
| EP | 0 406 170 A1 | 1/1991 |
| EP | 406170 A1 * | 1/1991 |
| EP | 2 132 103 B1 | 12/2011 |
| JP | 2001 097392 A | 4/2001 |
| WO | WO 00/43272 A1 | 7/2000 |
| WO | WO 2010/099902 A1 | 9/2010 |

OTHER PUBLICATIONS

International Search Report for corresponding PCT Patent Application No. PCT/EP2018/057242, mailed on Nov. 7, 2018.
International Written Opinion for corresponding PCT Patent Application No. PCT/EP2018/057242, mailed on Nov. 7, 2018.

* cited by examiner

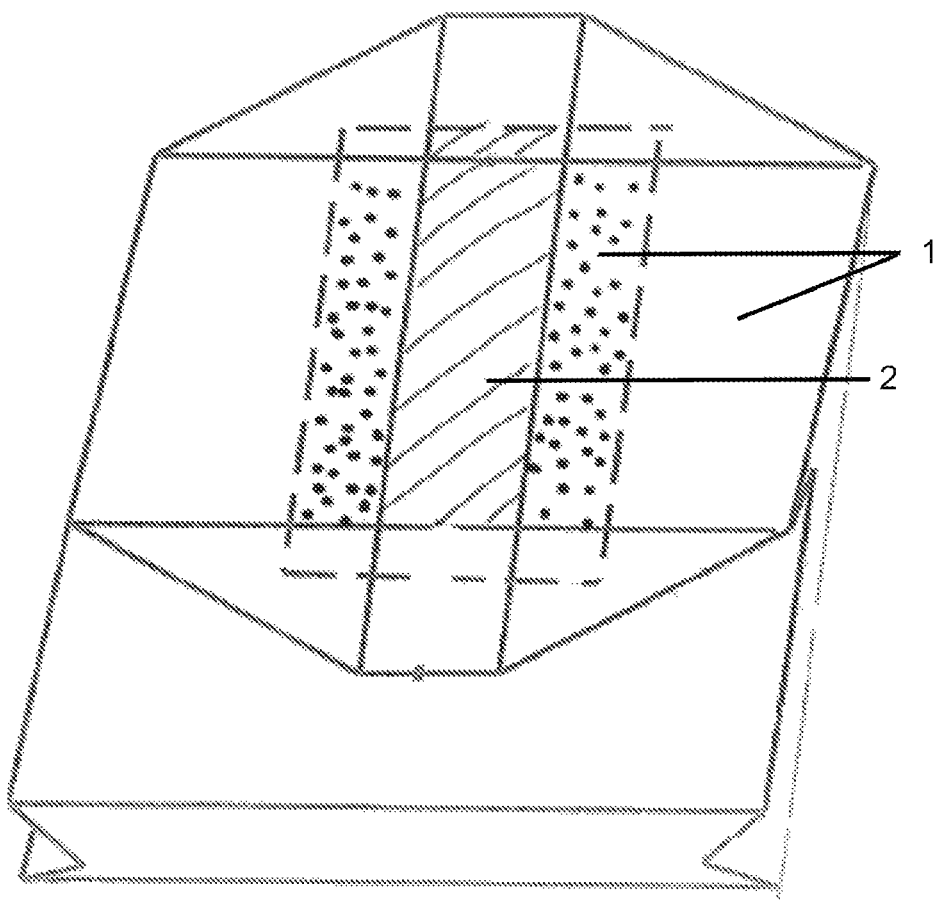

SACK FOR LIQUID AND PULVERULENT SUBSTANCES COMPRISING A SOLUBLE SURFACE PORTION, METHOD AND USE THEREWITH, AND USE OF A SOLUBLE SURFACE PORTION

CROSS REFERENCE TO RELATED APPLICATIONS

This application is a national stage application of International Application No. PCT/EP2018/057242, filed 22 Mar. 2018, which claims priority from European Patent Application No. 17163159.1, filed 27 Mar. 2017, which applications are incorporated herein by reference.

The present invention relates to a sack for or containing liquid and pulverulent materials, to a method for withdrawing a liquid or pulverulent material from such a sack, to a method for producing such a sack and to the use of the sack for the packing of liquid or pulverulent materials. The invention further relates to the use of an areal section composed of a water-soluble polymer as part of a sack for liquid or pulverulent materials for the reduction of the release of unpleasant odors and/or harmful substances into the air.

Mineral-based construction materials such as, for example, cement and quartz sand, but also other materials, such as, for example, crop protection agents and fertilizers, are frequently dissolved, or dispersed, in water before they are further processed. These materials are frequently packed in sacks or the like. In the case of liquid and also pulverulent materials, these are frequently released into the atmosphere, for example as vapors or (alveoli-reaching) dusts, when the contents of the sacks are poured into water. Appropriate protective equipment would be required to avoid individuals being exposed. On building sites where there is a large number of individuals working at the same time, this is difficult to implement, since work is frequently carried out with large quantities of construction materials, meaning dust exposures would constantly occur, i.e., it would be necessary to constantly wear protective equipment. The same applies to crop protection agents and fertilizers, which have to be poured into the appropriate agricultural machinery possibly in appropriate garages and a relatively long venting of said garages would be necessary.

However, fertilizers, crop protection agents and mineral dusts, such as, for example, cement dust, quartz dust, etc., to stay with the abovementioned examples, are frequently harmful to health, the concentration prevailing in the abovementioned situations being among the reasons for this. Depending on the material, for example aluminum powder for autoclaved aerated concrete, dust explosions may also occur if corresponding dusts should be released (which to date has to be avoided by, for example, suspension in oils, glycol ethers, etc.).

Legal regulations relating to occupational health and safety, especially exposure limits, have become more strict in recent years and further tightening can be expected in the future. Appropriately modifying the formulations so that fewer volatile constituents are present is conceivable in principle, for example pressing to form pellets is a theoretical option in the case of powders. However, not all powders can be pressed to form stable pellets which also do not form dusts after relatively long transport and the associated vibrations. Furthermore, a formulation-related adjustment is not possible in all cases, at least not without significantly increasing costs.

Another option is to provide novel packages which minimize or avoid the generation of vapors or dusts.

Packages composed of water-soluble polymers, for example polyvinyl alcohols, are known for laundry detergents. Here, the quantity of laundry detergent for one wash is filled into an appropriately small pouch composed of the water-soluble polymer and this vessel is then added to the wash. The vessel then completely dissolves and releases the laundry detergent.

EP 0 406 170 A1 and JP 2001 097392 A disclose packages, the bottom openings of which are closed with the aid of stitching or seals composed of water-soluble polymers, for example polyvinyl alcohols.

In the case of, inter alia, the abovementioned construction materials, crop protection agents, fertilizers, etc., relatively large containers are required in many cases (up to 25 kg and possibly even more). Here, appropriate sacks composed of water-soluble polymers such as polyvinyl alcohol would, owing to the mechanical stability, have a thickness giving rise to a relatively long dissolution time, which is not desirable. Alternatively, a surrounding package providing the mechanical stability would be conceivable. However, producing appropriate two-ply sacks, be it by conventional means or by means of form fill seal (FFS) method, requires significantly higher complexity in terms of equipment and thus significantly higher financial expenditure. In the case of the FFS method, two machines connected in series would be required for example.

Consequently, it is an object of the present invention to provide a package which is also suitable for higher weights, avoids or at least minimizes the release of unpleasant odors and/or harmful substances into the air and, at the same time, can be produced using existing machines with minor or even no modification.

The invention therefore provides a sack for liquid or pulverulent materials having a portion composed of water-insoluble paper and/or water-insoluble polymer and an areal section (F) composed of a water-soluble polymer, the areal section (F) being in direct contact with the filling material of the sack, wherein dissolution of the water-soluble polymer gives rise to an opening through which the sack can be emptied.

The sack according to the invention can be immersed into a vessel containing water such that the areal section (F) dissolves and the opening and emptying of the sack is thus done in part or in full with water. The materials present in the sack thus come into contact with water first, and the formation of dusts, especially alveoli-reaching dusts, and vapors (in the case of liquids) is therefore avoided or largely minimized. Moreover, the sack can be produced using all common methods, with negligible or even without any modification of these machines. Consequently, adjusting the formulations of the sack-packed materials, which is complicated or may even not be possible, is not necessary.

In the present invention, "areal section" means a subarea of the sack. Consequently, the term "areal section" excludes the entire sack consisting of the water-soluble polymer.

In the present invention, "direct contact with the filling material" means that the areal section (F) covers a section of the sack that has been omitted from the water-insoluble paper and/or water-insoluble polymer, with the result that the water-soluble polymer in the areal section (F) directly delimits the filling material from the environment. The present invention thus expressly excludes solutions in which the areal section (F) is used as sealing, bonding or stitching material for the sealing of portions of water-insoluble paper and/or water-insoluble polymer that are next to one another or on top of one another.

The areal section (F) is preferably situated entirely in the upper or the lower half of the sack, based on the height of the sack when the sack is upright and is viewed horizontally, it is more preferred when the areal section (F) is situated entirely in the upper or the lower quarter of the sack, based on the height of the sack when the sack is upright and is viewed horizontally, and it is even more preferred when the areal section (F) is situated on the upper side or the bottom area of the sack.

Some sacks have a stand-up bottom and a so-called valve bottom through which the sack is filled. For example, conventional sacks, for example for cement or dry mortar mixes, can have a stand-up bottom on which the sack stands on the ground while the upper side of the sack is opened and the contents are then tipped over into a pail or cement mixer.

In the present invention, the sack can likewise have a stand-up bottom and a valve bottom, the valve bottom or the stand-up bottom comprising or consisting of the areal section (F). In relation to this, it is for example possible for the areal section to be applied to the valve bottom or to the stand-up bottom before the filling of the sack, or for the areal section to be situated laterally on the sack, and so the sack can be welded or folded in a conventional manner.

In an alternative variant of the present invention, the sack can likewise have a stand-up bottom and a valve bottom, the areal section (F) being preferably situated entirely in the upper half of the sack, which also comprises the valve bottom, based on the height of the sack when the sack is upright and is viewed horizontally, it is more preferred when the areal section (F) is situated entirely in the upper quarter of the sack, which also comprises the valve bottom, based on the height of the sack when the sack is upright and is viewed horizontally, it is especially preferred when the valve bottom comprises the areal section (F), and it is even more preferred when the areal section (F) is situated entirely in the valve bottom.

In a preferred variant of the present invention, the sack can likewise have a stand-up bottom and a valve bottom, the areal section (F) being preferably situated entirely in the lower half of the sack, which also comprises the stand-up bottom, based on the height of the sack when the sack is upright and is viewed horizontally, it is more preferred when the areal section (F) is situated entirely in the lower quarter of the sack, which also comprises the stand-up bottom, based on the height of the sack when the sack is upright and is viewed horizontally, it is especially preferred when the stand-up bottom comprises the areal section (F), and it is even more preferred when the areal section (F) is situated entirely in the stand-up bottom. Said variant is especially preferred. Consequently, the conventional manufacturing method for such sacks need not be modified per se; merely the materials used must be adapted accordingly. Since stand-up bottoms are typically manufactured by means of a separate bottom sheet, production can be done in a conventional manner. If the areal section (F) is situated entirely in the stand-up bottom, it is for example only necessary to exchange the bottom sheet.

Preferably, the stand-up bottom does not entirely consist of the areal section (F). The reason therefor is that sacks having a stand-up bottom consisting entirely of the areal section (F) cannot by machine-manufactured using conventional paper sack machines.

In the case of a sack with stand-up bottom, it is preferred that the bottom area of the sack consists of a water-insoluble paper and/or water-insoluble polymer and the areal section (F).

Preferably, in this embodiment, the areal section (F) accounts for more than 11.5% and not more than 90% of the bottom area of the sack. The areal section (F) accounts for more preferably 15% or more and not more than 75%, even more preferably 20% or more and not more than 55% and most preferably 30% or more and not more than 45% of the bottom area of the sack.

If the areal section (F) accounts for 11.5% or less of the bottom area, the resultant opening of the sack is too small to ensure a rapid and complete emptying of the sack. If the areal section (F) accounts for more than 90% of the bottom area, the stability of the sack cannot be ensured.

The sack can have a carry handle. If the sack has a valve and a stand-up bottom and a carry handle, for example as stated above, the carry handle is preferably situated at the top, based on the sack when the sack is upright and is viewed horizontally, it is especially preferred when the sack comprises a carry handle as described above and the areal section (F) is situated entirely in the lower half of the sack, which also comprises the stand-up bottom, based on the height of the sack when the sack is upright and is viewed horizontally, it is more preferred when the areal section (F) is situated entirely in the lower quarter of the sack, which also comprises the stand-up bottom, based on the height of the sack when the sack is upright and is viewed horizontally, it is especially preferred when the stand-up bottom comprises the areal section (F), and it is even more preferred when the areal section (F) is situated entirely in the stand-up bottom.

Alternatively, the sack can be a block bottom sack, a block bottom bag, a cross bottom sack, a valve-side folding sack, a pinch bottom sack, a mini seal sack or a sealed rim bag.

Preferably, the areal section (F) accounts for not more than 35% of the surface area of the sack, more preferably not more than 25% of the surface area of the sack and even more preferably not more than 15% of the surface area of the sack. Furthermore, it is preferred that the areal section (F) accounts for at least 2% of the surface area of the sack, more preferably at least 5% of the surface area of the sack and even more preferably at least 7.5% of the surface area of the sack.

The material which also forms the areal section (F) can overlap with the further material(s) of the sack or subareas of the material which also forms the areal section (F) can be coated coated such that the material does not dissolve or dissolves in a delayed manner at the coated sites. For example, the latter may be the case when the bottom sheet used for conventional valve bottom sacks is a film coated at the edges and composed of water-soluble polymer, for example film coated at the edges with LDPE. The LDPE coating may simplify joining to other materials of the sack, there being no need for the overlap with the other materials from which the sack is manufactured and for the coating to be identical.

Here, the area of the areal section (F) is based on the area of the opening which arises after dissolution of the water-soluble polymer (see also FIG. 1).

In principle, the present invention is applicable to sacks of any size. However, in the case of small quantities (<500 mL), it may be simpler to use a package composed purely of water-soluble polymer (such as, for example, in the case of laundry detergents). Therefore, the sack of the present invention preferably has a volume of at least 500 mL, more preferably of at least 1.00 L and even more preferably of at least 5.00 L. Typically, the volume of the sack is not more than 70.0 L, preferably are not more than 30.0 L.

The areal section (F) can comprise one ply of water-soluble polymer or multiple plies of water-soluble polymer, typically not more than two plies of water-soluble polymer. However, it is preferred when the areal section (F) has only one ply of water-soluble polymer.

The water-soluble polymer is preferably selected from polyvinyl alcohol homo- or copolymers and partially hydrolyzed polyvinyl alcohol homo- or copolymers.

Particularly preferred water-soluble polymers are preferably based on a polyvinyl alcohol or a polyvinyl alcohol copolymer, the molecular weight of which is within the range from 10 000 to 1 000 000 g/mol, preferably from 20 000 to 500 000 g/mol, particularly preferably from 30 000 to 100 000 g/mol and in particular from 40 000 to 80 000 g/mol.

Polyvinyl alcohol is typically prepared by hydrolysis of polyvinyl acetate, since the direct synthesis route is not possible. The same applies to polyvinyl alcohol copolymers, which are prepared from accordingly from polyvinyl acetate copolymers. It is preferred when at least one ply of the areal section (F) comprises a polyvinyl alcohol, the degree of hydrolysis of which accounts for 70 to 100 mol %, preferably 80 to 90 mol %, particularly preferably 81 to 89 mol % and in particular 82 to 88 mol %. If the areal section (F) has multiple plies of water-soluble polymer, especially preferably all the plies comprise a polyvinyl alcohol, the degree of hydrolysis of which accounts for 70 to 100 mol %, preferably 80 to 90 mol %, particularly preferably 81 to 89 mol % and in particular 82 to 88 mol %.

It is possible to add additionally to the areal section (F) a polymer selected from the group comprising acrylic acid-containing polymers, polyacrylamides, oxazoline polymers, polystyrene sulfonates, polyurethanes, polyesters, polyethers, polylactic acid or mixtures of said polymers. If present, the proportion of said polymers of the areal section (F) is not more than 15% by weight, more preferably not more than 10% by weight.

Besides vinyl alcohol, the polyvinyl alcohol copolymers can comprise dicarboxylic acids as further monomers, for example itaconic acid, malonic acid, succinic acid and mixtures thereof, preference being given to itaconic acid.

Besides vinyl alcohol, the polyvinyl alcohol copolymers can comprise an ethylenically unsaturated carboxylic acid, salt thereof or ester thereof, for example acrylic acid, methacrylic acid, acrylates, methacrylates or mixtures thereof.

Suitable water-soluble polymers or films are, for example, films of the Solublon series (Aicello Chemicals), especially type KC, the Selvol product series from Sekisui and the Hi-Selon series from Nippon Gohsei.

Preferably, the areal section (F) consists of a film having a film thickness of more than 40 µm to 200 µm, more preferably having a film thickness of 45 µm to 175 µm, even more preferably of 50 µm to 150 µm and most preferably of 55 µm to 100 µm.

In this connection, the film can comprise or consist of one or more plies of the water-soluble polymer, as described above.

Preferably, the sack, except for the areal section (F), comprises or consists of water-insoluble paper and/or water-insoluble polymer. It is especially preferred that the water-insoluble paper is selected from recycled paper or kraft paper, even more preferably kraft paper, and the water-insoluble polymer is selected from polypropylene, polyacrylate, polyethylene terephthalate or polyethylene, especially polyethylene, for example LDPE or HDPE. The water-insoluble paper and the water-insoluble polymer can also be multi-ply. For example, the water-insoluble paper can be coated with a polymer, for example inner film.

The sack can, for example, be a paper sack or plastics sack which has the areal section (F) according to the present invention.

Paper sacks typically comprise or consist of a two-ply or three-ply material, optionally further comprising a polyethylene inner ply.

Plastics sacks can, for example, be (composite) film sacks or woven sacks. In the case of woven sacks, a polyethylene inliner having the areal section (F) of the present invention is typically used.

(Composite) film sacks normally have one or more polymer plies.

Attaching the areal section (F) to the sack material is known in the prior art. For example, the areal section (F) can be cold-welded, diffusion-bonded (is often used synonymously), solvent-welded, for example by means of tetrahydrofuran, or bonded by means of starch adhesive, dispersion adhesive or hot-melt adhesive with the water-insoluble paper and/or water-insoluble polymer. Alternatively, the areal section (F) can be attached by means of mechanical interlocking or compression.

In one embodiment, the sack can comprise sections composed of water-insoluble paper, water-insoluble polymer and the areal section (F).

In a particularly preferred embodiment, the sack is a paper sack, preferably composed of kraft paper, having a bottom area which consists of a proportion of water-soluble polymer, especially polyethylene, for example LDPE or HDPE, and the areal section (F) selected from polyvinyl alcohol homo- or copolymers and partially hydrolyzed polyvinyl alcohol homo- or copolymers. In said embodiment, the areal section (F) accounts for preferably more than 11.5% and not more than 90%, more preferably 15% or more and not more than 75%, even more preferably 20% or more and not more than 55% and most preferably 30% or more and not more than 45% of the bottom area of the sack.

In said particularly preferred embodiment, the bottom area is preferably joined, on all sides over the entire surface, possibly with a gap on the paper corner fold of the sack, to the paper area of the sack. Joining can be achieved by cold bonding, diffusion bonding, solvent welding, for example by means of tetrahydrofuran, bonding by means of starch adhesive, dispersion adhesive or hot-melt adhesive, mechanical interlocking, stitching or compression.

The areal section (F) of the sack can be completely covered by a cover sheet which is removable from the areal section. Such a cover sheet can protect the areal section (F) from mechanical damage or contact with moisture, if necessary.

In principle, possible options for fastening and removing the cover sheet are all methods which are also possible options for closing and opening the sack. In the present invention, the sack is accordingly not directly opened; instead, the underlying areal section (F) is uncovered.

For example, it is possible to use an opening aid, as described in EP 2 132 103 B1 for example, which can be a tear-open strip or a tear-open thread and which, on at least one areal end of the inner panel on one end of a paper sack, extends beyond said inner panel. The tear-open thread makes an easy opening possible, in this case an easy uncovering of the water-soluble areal section (F) of the cover sheet possibly present without a tool.

The cover sheet can also be bonded or stitched on.

It is further preferred that the sack, except for the areal section (F) and the removable cover sheet, comprise or consist of the same material.

A preferred embodiment, the sack, except for the areal section (F), comprises or consists of water-insoluble paper, especially kraft paper, and the water-soluble polymer is preferably selected from polyvinyl alcohol homo- or copolymers and partially hydrolyzed polyvinyl alcohol homo- or copolymers according to the present invention.

A preferred embodiment, the sack, except for the areal section (F), comprises or consists of water-insoluble polymer, especially polyethylene, for example LDPE or HDPE, and the water-soluble polymer is preferably selected from polyvinyl alcohol homo- or copolymers and partially hydrolyzed polyvinyl alcohol homo- or copolymers according to the present invention.

The sack preferably contains a liquid or pulverulent material; preferably
   the liquid material is selected from pesticides, for example crop protection agents, or biocides and
   the pulverulent material is selected from organic, inorganic and mineral powder products, such as, for example, dry mortar mix, cement, quartz sand, especially cement.

The present invention further provides a method for withdrawing a liquid or pulverulent material from a sack containing a liquid or pulverulent material, the method comprising the following steps in the order indicated
   a) optionally at least partly uncovering the areal section (F), if a cover sheet is present,
   b) introducing the sack into a water-containing vessel such that the areal section (F) is situated at least partly, preferably completely, below the water line,
   c) waiting until the areal section (F) has at least partially dissolved,
   d) pulling the sack out of the vessel, with the opening resulting from the at least partial dissolution of the areal section (F) being situated at least partly, preferably completely, below the water line during the pull-out.

A removable cover sheet, if present, need not be completely separated from the sack. When carrying out the invention, it is sufficient when the areal section (F) is partly uncovered. A complete uncovering is naturally preferred, since emptying proceeds more rapidly. A complete detachment of the removable cover sheet from the sack is likewise unnecessary. For example, it is sufficient when the generally (approximately) rectangular cover sheet, with one side, remains joined to the sack. This also facilitates the disposal of the empty sacks, since there are fewer individual parts.

Preferably, step c), especially preferably steps a) to d), is/are carried out at a temperature of over 0° C. It may take longer to dissolve the water-soluble polymer at lower temperatures.

Step c) typically takes 15 seconds to 5 minutes.

The invention further provides method for producing a sack according to the present invention, wherein an area of a water-insoluble paper or a water-insoluble polymer is attached to an area of a water-soluble polymer. As stated above, the sack can, for example, be a valve bottom sack, a block bottom sack, a block bottom bag, a cross bottom sack, a valve-side folding sack, a pinch bottom sack, a mini seal sack or a sealed rim bag.

Conventional sacks and their production methods are, for example, described in DE 20 2008 003 172 U1, WO 2010/099902 A1, EP 0 243 750 A2 and WO 2000/043272 A1.

Said methods are, in principle, also applicable to the production of the sacks according to the invention.

Preferred features of the sack of the present invention are also preferred features of the methods of the present invention.

The invention further provides for the use of a sack according to the present invention for the packing of liquid or pulverulent materials; preferably
   the liquid material is selected from pesticides, for example crop protection agents, or biocides and
   the pulverulent material is selected from organic, inorganic and mineral powder products, such as, for example, cement, quartz sand, especially cement.

The invention further provides for the use of an areal section (F) composed of a water-soluble polymer as part of a sack for liquid or pulverulent materials having a portion composed of water-insoluble paper and/or water-insoluble polymer and an areal section (F) composed of a water-soluble polymer, the areal section (F) being in direct contact with the filling material, for the reduction of the release of unpleasant odors and/or harmful substances into the air, especially for the reduction of the release of alveoli-reaching dusts.

Preferred features of the sack of the present invention are also preferred features of the uses of the present invention.

FIG. 1 shows an example of a modified valve bottom sheet (1) as part of a sack according to the present invention, in which the areal section (F) (2) in the bottom of the sack is situated and consists of a polyvinyl alcohol film. The modified valve bottom sheet (1) as part of the sack itself can, for example, consist of paper, especially kraft paper, or polyethylene, especially LDPE. The sack itself can, for example, consist of paper or LDPE.

The invention claimed is:

1. A sack for liquid or pulverulent filling materials having a portion composed of water-insoluble paper and/or water-insoluble polymer and an areal section (F) composed of a water-soluble polymer, wherein the areal section (F) accounts for more than 5% and not more than 35% of the surface area of the sack, wherein the areal section (F) is in direct contact with the filling materials of the sack, and wherein dissolution of the water-soluble polymer gives rise to an opening through which the sack can be emptied.

2. The sack according to claim 1, wherein the areal section (F) is situated entirely in the upper half or the lower half of the sack, based on the height of the sack when the sack is upright and is viewed horizontally.

3. The sack according to claim 1, wherein the areal section (F) is situated entirely in the upper quarter or the lower quarter of the sack, based on the height of the sack when the sack is upright and is viewed horizontally.

4. The sack according to claim 1, wherein the areal section (F) is situated on the upper side or the bottom area of the sack.

5. The sack according to claim 1, wherein the bottom area of the sack consists of a water-insoluble paper and/or water-insoluble polymer and the areal section (F), the areal section (F) accounting for more than 11.5% and not more than 75% of the bottom area of the sack.

6. The sack according to claim 1, wherein the water-soluble polymer is selected from polyvinyl alcohol homopolymers or copolymers and partially hydrolyzed polyvinyl alcohol homopolymers or copolymers.

7. The sack according to claim 1, wherein the water-insoluble paper is selected from recycled paper or kraft paper and the water-insoluble polymer is selected from polypropylene, polyacrylate, polyethylene terephthalate or polyethylene.

8. The sack according to claim 1, wherein the areal section (F) consists of a film having one or more plies of the water-soluble polymer, wherein the film thickness is more than 40 µm to 200 µm.

9. The sack according to claim 1, wherein the areal section (F) is completely covered by a removable cover sheet.

10. The sack according to claim 9, wherein the sack, except for the areal section (F) and the removable cover sheet, comprise or consist of the same material.

11. The sack according to claim 1, wherein the sack contains a liquid or pulverulent material.

12. A method for withdrawing a liquid or pulverulent material from a sack according to claim 11, comprising the following steps in the order indicated
   a) optionally at least partly uncovering the areal section (F), if a cover sheet is present,
   b) introducing the sack into a water-containing vessel such that the areal section (F) is situated at least partly below the water line,
   c) waiting until the areal section (F) has at least partially dissolved,
   d) pulling the sack out of the vessel, with the opening resulting from the at least partial dissolution of the areal section (F) being situated at least partly below the water line during the pull-out.

13. A method for producing a sack according to claim 1, wherein an area of a water-insoluble paper or a water-insoluble polymer is attached to an area of a water-soluble polymer.

14. A method comprising packing of liquid or pulverulent materials in the sack according to claim 1.

15. The method according to claim 14, for the reduction of the release of unpleasant odors and/or harmful substances into the air.

16. The method according to claim 14, for the reduction of the release of alveoli-reaching dusts.

\* \* \* \* \*